United States Patent
Fujita et al.

(10) Patent No.: US 6,964,713 B2
(45) Date of Patent: Nov. 15, 2005

(54) COPPER BASE ALLOY SUITABLE FOR USE AS MATERIAL FOR SLIDING MEMBER

(75) Inventors: Masahito Fujita, Aichi (JP); Eisaku Inoue, Aichi (JP); Takayuki Shibayama, Aichi (JP)

(73) Assignee: Daido Metal Company Ltd., Aichi (JP)

( * ) Notice: Subject to any disclaimer, the term of this patent is extended or adjusted under 35 U.S.C. 154(b) by 0 days.

(21) Appl. No.: 10/684,801

(22) Filed: Oct. 15, 2003

(65) Prior Publication Data
US 2004/0136860 A1 Jul. 15, 2004

(30) Foreign Application Priority Data
Oct. 15, 2002 (JP) ............... 2002-300403

(51) Int. Cl.[7] .......................... C22C 9/04; F16C 13/00; F16C 17/00
(52) U.S. Cl. ..................... 148/434; 420/482
(58) Field of Search ................ 148/434; 420/482

(56) References Cited

U.S. PATENT DOCUMENTS 5,582,281 A * 12/1996 Nakashima et al. ... 192/107 M

FOREIGN PATENT DOCUMENTS

JP 09316570 * 12/1997

* cited by examiner

Primary Examiner—Sikyin Ip
(74) Attorney, Agent, or Firm—Browdy and Neimark, PLLC

(57) ABSTRACT

A copper base alloy suitable for use as a material for a sliding member used under severe sliding conditions such as a floating bush bearing of a turbocharger used in automobiles is disclosed. The alloy comprises, by mass %, 15 to 25% Zn, 4.2 to 10% Di, 2 to 7% Mn, 1 to 3% Si and balance of Cu and unavoidable impurities, the alloy having a structure of which matrix is composed of α-single phase, wherein a eutectic structure of the α-phase and an Mn—Si compound and Bi particle are distributed throughout the matrix.

3 Claims, 4 Drawing Sheets

MATRIX (α-PHASE)

Bi

EUTECTIC STRUCTURE OF α-PHASE AND Mn-Si COMPOUND

FIG. 2

| | | COMPOSITION (MASS %) | | | | | | | | | HEAT TREATMENT *1 |
|---|---|---|---|---|---|---|---|---|---|---|---|
| | | Cu | Zn | Al | Mn | Si | Bi | Pb | Se | B | |
| COMPARED PRODUCT | 1 | REMAINDER | 20.0 | - | 2.5 | 1.0 | - | 6.5 | - | - | - |
| | 2 | REMAINDER | 30.0 | 3.0 | 3.0 | 1.0 | - | - | - | - | - |
| | 3 | REMAINDER | 35.0 | - | 2.5 | 1.0 | - | - | - | - | - |
| | 4 | REMAINDER | 35.0 | - | 2.5 | 1.0 | 2.0 | - | - | - | - |
| | 5 | REMAINDER | 42.0 | - | 2.5 | 1.0 | 2.0 | - | - | - | - |
| INVENTION PRODUCT | 1 | REMAINDER | 20.0 | - | 2.5 | 1.0 | 6.5 | - | - | - | - |
| | 2 | REMAINDER | 20.0 | - | 5.0 | 2.0 | 6.5 | - | - | - | - |
| | 3 | REMAINDER | 20.0 | - | 5.0 | 2.0 | 6.5 | - | - | - | CARRIED OUT |
| | 4 | REMAINDER | 20.0 | - | 5.0 | 2.0 | 6.5 | - | 0.1 | - | CARRIED OUT |
| | 5 | REMAINDER | 20.0 | - | 5.0 | 2.0 | 6.5 | - | - | 0.05 | CARRIED OUT |
| | 6 | REMAINDER | 20.0 | - | 5.0 | 2.0 | 4.2 | - | - | - | - |
| | 7 | REMAINDER | 20.0 | - | 5.0 | 2.0 | 10.0 | - | - | - | - |

| MATRIX | COMPOUND | HARDNESS (Hv) | MAXIMUM SPECIFIC LOAD NOT CAUSING SEIZURE (MPa) *2 | WEAR (mm) |
|---|---|---|---|---|
| α-PHASE | Mn-Si | 100 | 50 (OR MORE) | 0.012 |
| α-PHASE+β-PHASE | Mn-Si | 200 | 20 | 0.003 |
| α-PHASE+β-PHASE | Mn-Si | 125 | 20 | 0.006 |
| α-PHASE+β-PHASE | Mn-Si | 125 | 35 | 0.005 |
| β-PHASE | Mn-Si | 180 | 35 | 0.003 |
| α-PHASE | Mn-Si | 100 | 50 (OR MORE) | 0.010 |
| α-PHASE | Mn-Si | 100 | 50 (OR MORE) | 0.005 |
| α-PHASE | Mn-Si | 150 | 50 (OR MORE) | 0.003 |
| α-PHASE | Mn-Si | 150 | 50 (OR MORE) | 0.002 |
| α-PHASE | Mn-Si | 150 | 50 (OR MORE) | 0.002 |
| α-PHASE | Mn-Si | 100 | 50 (OR MORE) | 0.005 |
| α-PHASE | Mn-Si | 100 | 50 (OR MORE) | 0.006 |

WHERE *1 HEAT TREATMENT WAS CARRIED OUT AT 400 °C FOR 1 HOUR.
*2 MAXIMUM SPECIFIC LOAD WAS 50 MPa IN THE EXPERIMENT.

FIG. 3

| ITEM | CONDITIONS OF SEIZURE RESISTANCE TEST | UNIT |
|---|---|---|
| SAMPLE DIMENSIONS | OD × ID = φ25 × φ21.7 | mm |
| REVOLUTION | 820 | rpm |
| SPEED | 1.0 | m/s |
| LUBRICANT | SAE#30 | - |
| LUBRICATING METHOD | OIL BATH | - |
| LUBRICANT TEMPERATURE | ROOM TEMP | °C |
| COUNTERPART MATERIAL | S55C | - |
| COUNTERPART MATERIAL ROUGHNESS | NOT MORE THAN 0.3 | Rz μm |
| COUNTERPART MATERIAL HARDNESS | ≥ 560 | HV |

| ITEM | CONDITIONS OF WEAR RESISTANCE TEST | UNIT |
|---|---|---|
| SAMPLE DIMENSIONS | OD×ID=φ25×φ21.7 | mm |
| REVOLUTION | 8.2 | rpm |
| SPEED | 0.01 | m/s |
| SPECIFIC LOAD | 10 | MPa |
| TIME | 8 | HOUR |
| LUBRICANT | SAE#30 | - |
| LUBRICATING METHOD | OIL BATH | - |
| LUBRICANT TEMPERATURE | 150 | °C |
| COUNTERPART MATERIAL | S55C | - |
| COUNTERPART MATERIAL ROUGHNESS | 1.0 | Rz μm |
| COUNTERPART MATERIAL HARDNESS | ≧560 | HV |

FIG. 4

COPPER BASE ALLOY SUITABLE FOR USE AS MATERIAL FOR SLIDING MEMBER

BACKGROUND OF THE INVENTION

1. Field of the Invention

This invention relates to a copper base alloy having high resistances to seizure, wear and the like, suitable for use as a material of a sliding member, and more particularly to such a copper base alloy suitable for use as a material for a sliding bearing used under severe sliding conditions such as a floating bush bearing of a turbocharger used in automobiles.

2. Description of the Related Art

Automobile engines have recently been provided with turbochargers for the purpose of achieving high power. In turbochargers, an exhaust gas is used to rotate a turbine at high speeds so that a compressor is driven. Accordingly, conditions under which a floating bush bearing supporting a turbine shaft is used are very severe or heavy.

For example, a lubricant pump is stopped simultaneously with stop of an engine when the engine is stopped immediately after high speed rotation. Since a floating bush bearing is ceased to be cooled by a lubricant, the floating bush bearing is heated by a high heated turbine casing such that the temperature of the floating bush bearing exceeds 300° C. When the engine is re-started under these conditions, supply of the lubricant is retarded although the turbine immediately reaches 100,000 rpm. Accordingly, the floating bush bearing bears the turbine shaft without supply of the lubricant (a dried-up condition). The floating bush bearing is required to provide a high anti-seizure property, high wear resistance and the like even under the dried-up condition.

JP-A-3-215642 discloses a material for a sliding member meeting the foregoing requirements. The disclosed material consists of, by mass %, 1 to 3.5% Mn, 0.3 to 1.5% Si, 10 to 25% Zn, 5 to 18% Pb, and balance of Cu and unavoidable impurities. The material thus contains Pb dispersed uniformly throughout the structure and is a high strength brass having a microstructure of which matrix is composed of α-single phase. The material disclosed in JP-A-3-215642 will hereinafter be referred to as "first conventional copper base alloy."

JP-A-9-316570 also discloses another material meeting the foregoing requirements. The disclosed material consists of, by mass %, 0.3 to 5% Mn, 0.3 to 3% Si, 15 to 37% An, 0.3 to 4% Bi, and balance of Cu and unavoidable impurities. An amount of β-phase in the metal structure of the disclosed material is controlled to be not more tha 30%. The material is a silicified manganese high strength brass and has a cold workability. The material disclosed in JP-A-9-316570 will hereinafter be referred to as "second conventional copper base alloy."

However, the aforesaid first conventional copper base alloy contains Pb although the alloy is superior in the resistances to seizure, wear and the like. Use of Pb should be avoided since Pb is a substance contaminating environment.

Furthermore, the second conventional copper base alloy contains the β-phase in the matrix. The wear resistance can be improved since the β-phase is hard. However, when used as a bearing alloy for bearings used under severe conditions such as the floating bush bearing of the turbocharger, the second conventional copper base alloy has a possibility of seizure particularly in the driedup state. The possibility of seizure has not been overcome yet.

SUMMARY OF THE INVENTION

Therefore, an object of the present invention is to provide a copper base alloy suitable for use as a material for a sliding member, which has high resistances to seizure and wear, friction characteristics and conformability without use of Pb contaminating the environment even when used as a material for a sliding bearing used under severe sliding conditions such as a floating bush bearing of a turbocharger used in automobiles.

To achieve the object, the present invention provides a copper base alloy suitable for use as a material of a sliding member comprising, by mass %, 15 to 25% Zn, 4.2 to 10% Bi, 2 to 7% Mn, 1 to 3% Si and balance of Cu and unavoidable impurities, the alloy having a structure of which matrix is composed of α-single phase, wherein a eutectic structure of the α-phase and an Mn—Si compound and Bi particle are distributed throughout the matrix.

An α-phase is softer than a β-phase. On the other hand, the eutectic structure of the α-phase and the Mn—Si compound has a tenacity and an excellent sliding characteristic. Consequently, since the tenacious eutectic structure of the α-phase and the Mn—Si compound is distributed in the structure of softer α-single phase, the copper base alloy has high resistances to seizure and wear, friction characteristics and conformability. This is one of major features.

Another feature of the invention is that the copper base alloy does not contain Pb but does contain Bi instead thereof. Bi is a solid lubricant contributing improvement in an anti-seizure property. Furthermore, Bi does not combine with Fe or Cu into an alloy as well as Pb and is distributed as minute particle in the matrix. When the copper base alloy containing Bi is used as a bearing alloy and temperatures of sliding surfaces' of a counter shaft and the bearing are increased, Bi interposed between the sliding surfaces exercises lubricity.

More specifically, Bi has a larger heat of melting than Pb, that is, the heat of melting of Bi is 11.3 kJ/mol whereas that of Pb is 4.77 kJ/mol. Bi prevents, by its heat of melting, the surface temperature of the bearing from being increased when the temperature of the sliding surface of the bearing exceeds the heat of melting of Bi due to heat by friction between the sliding surfaces of the counter shaft and the bearing. The melted Bi forms a thin film on the sliding surface, thereby preventing seizure between the bearing and counter shaft. Additionally, since Bi is minutely distributed in the matrix, the conformability and friction characteristic of the bearing alloy can be improved.

FIG. 1 illustrates the structure of the alloy in accordance with the present invention. As obvious from FIG. 1, it is understood that the minute Bi particle is uniformly distributed in the matrix of α-single phase and the eutectic structure of α-phase and Mn—Si compound is uniformly distributed into a lamellar form. The copper base alloy shown in FIG. 1 consists of, by mass %, 20% Zn, 6.5% Bi, 5% Mn, 2% Si and balance of Cu and unavoidable impurities.

A description will be given of the functions of the alloy elements and reasons of limitation of contents of these elements.

(1) Zn: 15 to 24 Mass %

Zinc is an element which provides high strength and wear resistance, as well as corrosion resistance to lubricating oil. A content of Zn will be described. According to a Cu-Zn phase diagram, the matrix has a structure of α-single phase when the content of Zn is not more than 38 mass %. The β-phase structure appears when the content exceeds 38 mass %. However, when a third element solving in the α-phase or β-phase or Mn and Si in the invention are added, the matrix structure is changed as though Mn and Si increase an added amount of Zn. Accordingly, the matrix of α-single phase can be obtained when a maximum added amount of Zn is determined to be 25 mass % in view of the contents of Mn and Si. However, when the content of Zn is less than 15 mass %, the effect of resistance to wear and corrosion relative to the lubricant is reduced.

(2) Bi: 4.2 to 10 Mass %

Bi improves the anti-seizure property, conformability and friction characteristics. These effects are not sufficient when an amount of Bi added is less than 4.2 mass %. Furthermore, when an amount of Bi added exceeds 10 mass %, a material strength is reduced and accordingly, the bearing performance results in a problem.

(3) Mn: 2 to 7 Mass %

Mn improves the strength of the matrix. Furthermore, Mn [has a high hardness and] forms an Mn—Si compound ($Mn_5Si_3$) having a high hardness and fine sliding characteristic, contributing to improvements in the resistance to wear, anti-seizure property and frictional property. When the content of Mn is less than 2 mass %, the aforesaid effects cannot be achieved. When the content of Mn exceeds 7 mass %, significance of aforesaid Zn is reduced.

(4) Si: 1 to 3 Mass %

As stated above, silicon reacts with manganese so as to form the intermetallic compound which contributes to improvement in the resistance to wear, anti-seizure property and frictional property. The content of silicon is determined in accordance with the content of Mn—Si compound to be obtained. The whole silicon is changed into the above-mentioned compound when the ration of the manganese content and the silicon is 1:0.3 in terms of mass ratio. Thus, the silicon content should be 0.6 mass % at the smallest. Since not all the silicon serves to form the intermetallic compound, the minimum silicon content is determined to be 1 mass % in the invention. Addition of silicon in excess of 4 mass % results in an embrittlement of the alloy.

The copper base alloy of the invention preferably has a Vickers hardness ranging from 90 to 180. In particular, the copper base alloy can be heat-treated, for example, at 400° C. for one to five hours after the casting for the purpose of improvement in the hardness thereof, whereby age-hardening can be carried out. The heat treatment can obtain the Vickers hardness ranging from 120 to 180. Thus, since a further hardened copper base alloy is obtained, the wear resistance can further be improved in addition to the above-described features. The heat-treatment temperature preferably ranges from 350° C. to 600° C., and more preferably, the heat-treatment temperature is about 400° C. 0.05 to 0.3 mass % Se and/or 0.01 to 0.2 mass % B is preferably added to the copper base alloy of the invention. Selenium accelerates distribution and refinement of bismuth in the matrix, thus contributing to sufficiently bring out the properties of bismuth. Furthermore, addition of bismuth has the effect of refining the crystal grain and accordingly, a strong copper base alloy can be formed.

BRIEF DESCRIPTION OF THE DRAWINGS

Other objects, features and advantages of the present invention will become clear upon reviewing the following description of the embodiment, made with reference to the accompanying drawings, in which:

FIG. 2 shows compositions of products of the present invention and compared products and experimental results;
FIG. 3 shows conditions of seizure resistance test;
and
FIG. 4 shows conditions of wear resistance test.

DETAILED DESCRIPTION OF THE INVENTION

Figure 1:
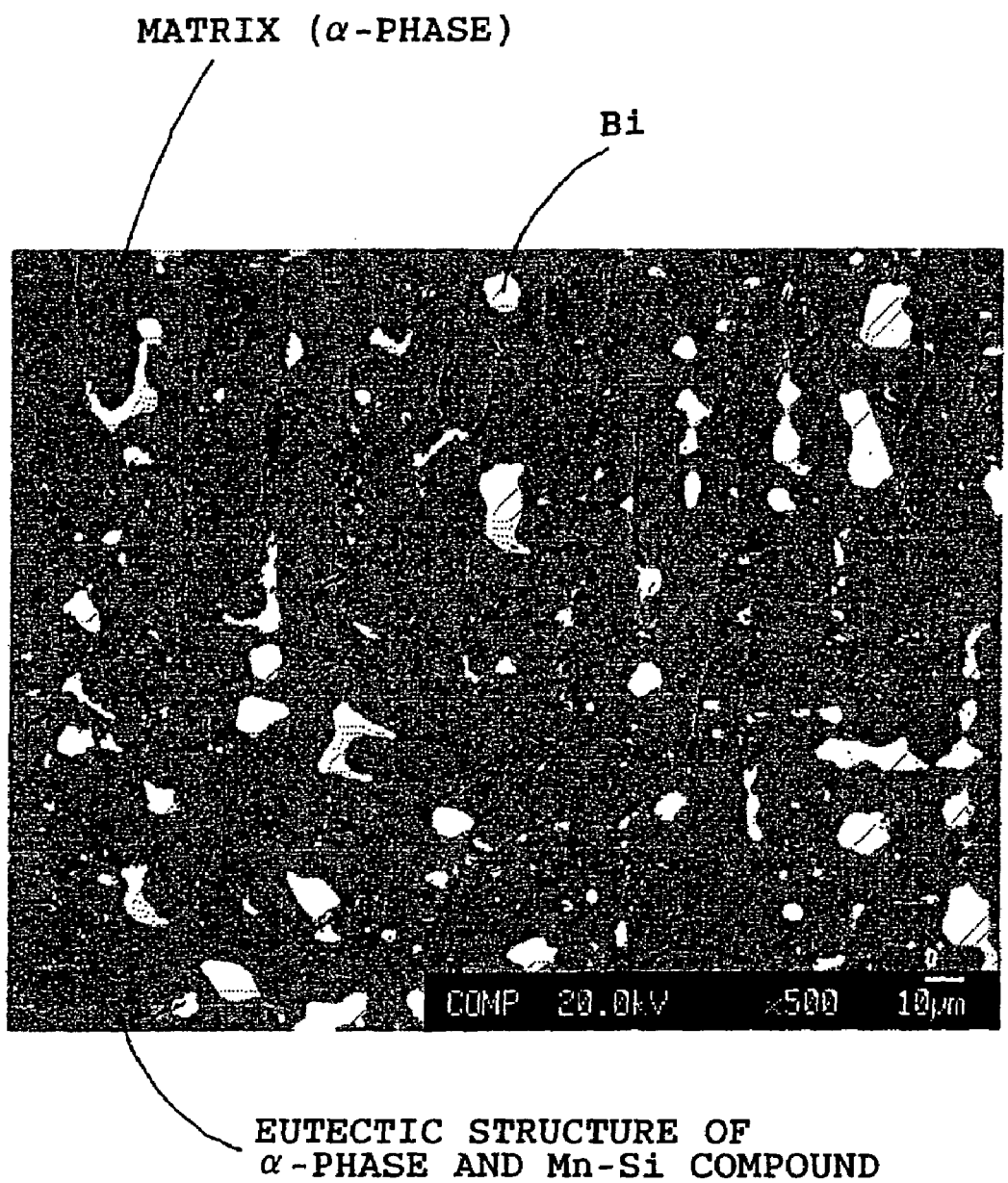
FIG. 1 is a microphotograph of the copper base alloy in accordance with the present invention.

FIG. 2 shows alloy compositions of invention products 1 to 7 in accordance with the present invention and compared products 1 to 5. The alloys were melted and formed into bars by the continuous casting. The bars were machined into test pieces for the seizure resistance test and wear resistance test.

Regarding invention products 3 to 5, the test pieces were heat-treated at 400° C. for one hour for the purpose of improvement in the hardness after casting.

FIG. 3 shows the conditions of the seizure resistance test and FIG. 4 shows the conditions of the wear resistance test.

In the seizure resistance test, a bearing specific load was increased from 5 MPa to 50 MPa by 5 MPa every 30 minutes. Occurrence of seizure was determined when a rear face temperature of the bearing exceeded 200° C. or when a frictional force reached 490 N. cm. FIG. 2 shows the results of the seizure resistance test thus conducted under the above-mentioned conditions.

In the wear resistance test, a running-in was carried out at the bearing specific load of 5 MPa for 10 minutes and thereafter, at the bearing specific load of 10 MPa for 8 hours. Subsequently, an amount of wear was measured. FIG. 2 shows the results of the measurement.

The experimental results in FIG. 2 were obtained from the test pieces formed of the bars made by the continuous casting. However, the similar results were achieved from static casting or the like. Accordingly, a casting manner employed in the invention should not be limited to the one described herein.

The experimental results will be examined. Firstly, in the seizure resistance test, invention products 1 to 7 containing 4.2 to 10 mass % Bi each exhibit superior seizure resistance. Compared product 1 also exhibits superior seizure resistance since the product contains 6.5 mass % Pb. However, compared products 2 and 3 not containing Pb nor Bi have low seizure resistance. Compared products 4 and 5 each containing only 2 mass % Bi also have low seizure resistance.

Invention product 1 contains 6.5 mass % Bi, whereas compared product 1 contains 6.5 mass % Pb. Invention product 1 containing Bi is superior in the wear resistance to the compared product.

Furthermore, in the wear resistance test, invention product 2 exhibits an improved wear resistance since the contents of Mn and Si in invention product 2 are larger than those of invention product 1. Although invention product 3 has the same composition as invention product 2, the product 3 exhibits higher wear resistance wince invention product 3 was heat-treated.

Invention products 4 and 5 each have the same composition as invention product 3. Since invention products 4 and 5 were heat-treated and contained selenium or boron, the matrix was refined and Bi particle was refined and uniformly distributed, whereupon further improvement in the resistance to wear was achieved.

The copper base alloy of the present invention should not be limited to the use as a material for a floating bush bearing of a turbocharger used in automobiles. The copper base alloy of the invention may be applied to various sliding members used under severe conditions, for example, under each of which high resistances to seizure and wear, frictional properties and conformability are required.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A copper base alloy suitable for use as a material for a sliding member comprising, by mass %, 15 to 25% Zn,
4.2 to 10% Bi,
2 to 7% Mn,
1 to 3% Si,
0.05 to 0.3% Se,
optionally 0.01 to 0.2% B, and
balance of Cu and unavoidable impurities, the alloy having a structure of which matrix is composed of α-single phase, wherein a eutectic structure of the α-phase and an Mn—Si compound and Bi particle are distributed throughout the matrix.

2. A copper base alloy according to claim 1, which has a Vickers hardness ranging from 90 to 180.

3. A copper base alloy according to claim 1, which is heat-treated to be hardened so as the have Vickers hardness ranging from 120 to 180.

* * * * *